Dec. 31, 1968 S. A. HORNUNG ETAL 3,419,733
ELECTRONIC TIMING CIRCUIT
Filed Sept. 22, 1965
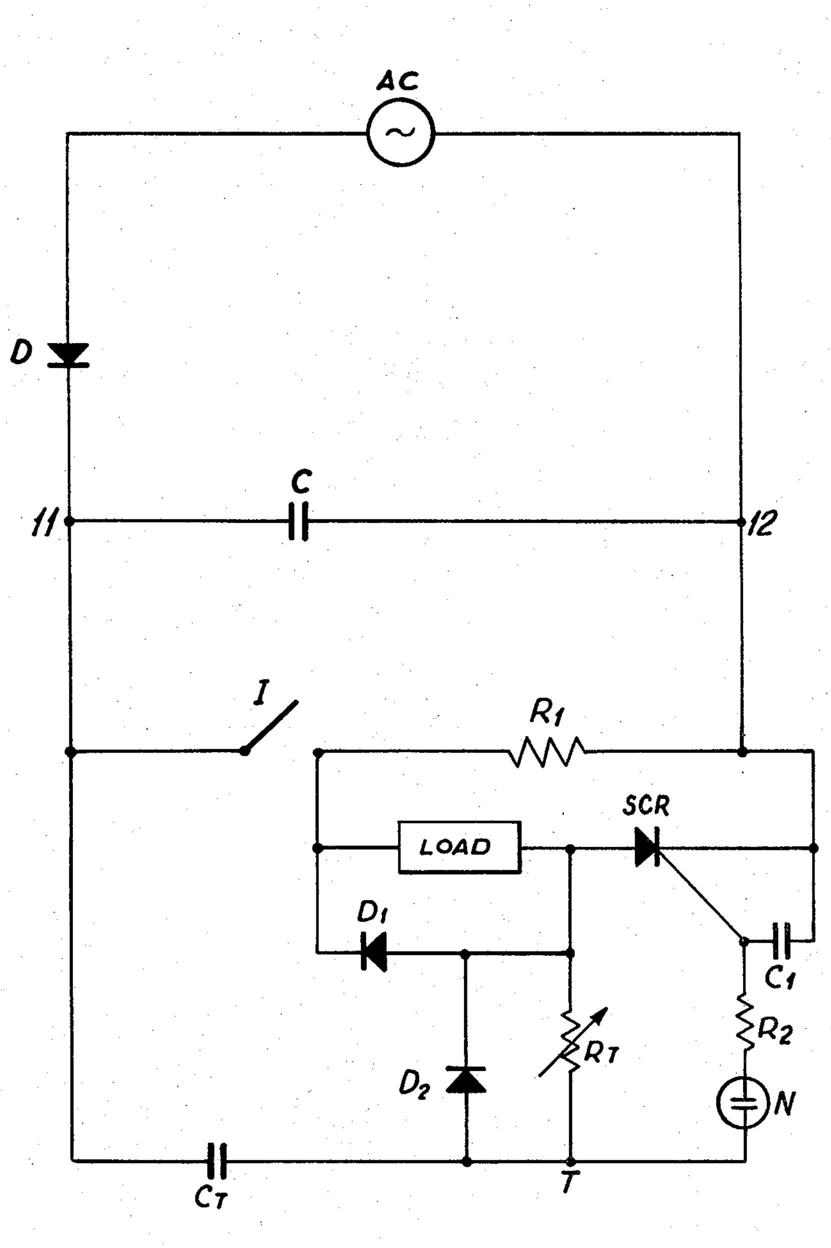
INVENTORS
STEPHEN A. HORNUNG
JAMES H. STICHWEH
WILLIAM R. BLACK
Hopgood & Calimafde
ATTORNEYS.

United States Patent Office 3,419,733

Patented Dec. 31, 1968

3,419,733

ELECTRONIC TIMING CIRCUIT

Stephen A. Hornung, James H. Stichweh and William R. Black, Louisville, Ky., assignors to K. M. White Company, Louisville, Ky., a corporation of Kentucky Filed Sept. 22, 1965, Ser. No. 489,259
11 Claims. (Cl. 307—141)

ABSTRACT OF THE DISCLOSURE

An electronic timing circuit includes an RC circuit coupled in series with a silicon controlled rectifier between a pair of DC source terminals. The junction of the resistor and capacitor in the RC circuit if coupled to the control electrode of the silicon controlled rectifier through a neon tube which acts as a threshhold device. The load is connected in series between one terminal of the DC source and that electrode of the silicon controlled rectifier connected to the series RC circuit.

This invention relates to timing devices in general and in particular to a novel electronic timer of relatively substantial duration.

Electronic timers of the order of several minutes generally require sophisticated circuitry predicated upon the charge time of a rather expensive high quality capacitor having the lowest practical leakage factor. While conventional timers are available which utilize the discharge (rather than the charge) time of an inexpensive capacitor, these timing circuits generally require a normally closed contact which opens to initiate the timing cycle. This latter arrangement, however, is inflexible and often introduces control circuit problems.

Accordingly, it is the object of this invention to obviate the foregoing disadvantages of conventional electronic timers and provide an inexpensive timer of relatively long duration.

It is a further object of this invention to provide an electronic timer which resets substantially instantaneously, and is available for recycling immediately.

Briefly, the electronic timer according to the invention derives its time function by the discharge of a capacitor into a large resistance initiated by the closing of a contact which also serves to carry the load current. The capacitor resistive junction serves as a voltage reference for a threshhold device (for example, a neon tube) which in turn triggers an electronic latching switch (for example a silicon controlled rectifier). The firing of the threshhold device also serves to initiate the recharge of the timing capacitor which attains full charge before deenergization of the load.

The above mentioned and other features and object of this invention and the manner of attaining them will oecome more apparent and the invention itself will best be understood by reference to the following description of an embodiment of the invention taken in conjunction with the accompanying drawings wherein the single figure schematically illustrates an embodiment of the electronic timer according to the invention.

Turning now to the figure, it may be seen that the series circuit constituted by the timing capacitor $C_T$, diodes $D_1$ and $D_2$, and resistor $R_1$ is normally across the DC terminals 11 and 12 (diode D and capacitor C are of course unnecessary if the source is itself DC). By virtue of this series circuit, capacitor $C_T$ is maintained in its fully charged condition while awaiting initiation of its timing cycle. Diodes $D_1$ and $D_2$ are not necessarily requisite to the foregoing function since a second charge path is also available via timing resistor $R_T$, the load, and resistor $R_1$. These diodes do, however, provide various ancillary functions which will be explained hereinafter.

Closure of the switch I initiates the timing cycle; timing capacitor $C_T$ discharging through the timing resistor $R_T$ (whose value is appropriately adjusted to the interval desired), the load and the switch contacts. Alternative discharge paths are blocked by the poling of diodes $D_1$ and $D_2$ and the non-conducting state of the neon tube N.

As the capacitor discharges, the voltage across it drops, and the differential voltage across the neon tube rises (i.e. the voltage at point T rises) at a rate directly dependent upon the time constant $C_T R_T$. At its breakdown voltage, neon tube N conducts, applying a control voltage to the silicon controlled rectifier SCR and turning it ON.

At this juncture it bears mentioning that the neon tube may be replaced by any threshhold device (e.g. a Zener diode) which is capable of exhibiting an accurate trigger point to the silicon controlled rectifier. A less desirable embodiment would also be achieved by eliminating the threshold device (neon tube) and triggering the SCR directly with the T-junction voltage.

As the neon tube N conducts, the voltage across it drops and simultaneously capacitor $C_T$ begins being recharged via resistor $R_2$ and the control-cathode junction of the silicon controlled rectifier. When a voltage below the maintaining voltage of the neon tube is reached tube N shuts off.

The capacitor has now been charged to the applied DC source voltage minus the neon tube maintaining voltage. The timing capacitor continues to charge, however, through the path $D_2$–SCR to full charge. While smaller charge paths (such as $R_T$–SCR) also exist when the neon tube has ceased to conduct, the small forward resistance of the diode $D_2$ greatly enhances the charge rate of the capacitor $C_T$ vis-a-vis these other paths, and therefore quickens the reset of the circuit.

The silicon controlled rectifier does not turn off when its control potential drops to zero, but continues to conduct current through the load until the anode voltage is interrupted. It will be apparent to those skilled in the art that the silicon controlled rectifier functions in the described arrangements as an electronic latching device. Accordingly, other species of such devices may also be employed in place of the SCR. Examples of such devices are a thyratron, and a self-biased transistor.

When contact I is opened, the silicon controlled rectifier anode potential is interrupted. The SCR therefore ceases to conduct and effectively removes the load from the circuit. At this point, the timing capacitor $C_T$ is fully charged and recycling may take place immediately. Where a time delay exists between the opening of contacts I and their closure (for recycling) resistor $R_1$ ensures that a maintaining voltage will be available to the timing capacitor.

Capacitor $C_1$ is of small value and is included to eliminate SCR transients and ameliorate performance. Diode $D_2$ functions to shunt inductive load kicks which might otherwise injure the silicon controlled rectifier.

While we have described above the principles of our invention in connection with specific apparatus, it is to be clearly understood that this description is made only by way of example and not as a limitation to the scope of our invention as set forth in the objects thereof and in the accompanying claims.

We claim:

1. An electronic timing circuit comprising:
a pair of DC source terminals;
an RC circuit, including a series connected timing capacitor and timing resistor, coupled to one of said terminals;
an electronic latching device having cathode, anode and control electrodes coupled, via its anode and cathode electrodes, between said RC circuit and the other terminal of said DC source;

means coupling the junction of the capacitor and resistor of the RC circuit to the control electrode of said latching device for initiating the firing thereof;

a pair of switchable contacts and a pair of load terminals connected in series between the said one terminal of said DC source and the electrode of said latching device connected to said RC circuit;

and means for maintaining the charge on said capacitor when said circuit is quiescent.

2. The electronic timing circuit claimed in claim 1, wherein said means for maintaining the charge on said capacitor is a resistor coupled between one of said switchable contacts and the other of said DC source terminals.

3. The electronic timing circuit claimed in claim 1, wherein said means coupling the junction to the control electrode of said latching device comprises a threshold device, firing when a predetermined voltage appears across its terminals.

4. The electronic timing circuit claimed in claim 3, further comprising a diode in parallel with said timing resistor for reducing the reset time of said circuit.

5. The electronic timing circuit claimed in claim 4 wherein said latching device consist of a silicon controlled rectifier.

6. The electronic timing device claimed in claim 5 further comprising a second capacitor coupled between the control electrode of the silicon controlled rectifier and the other terminal of said DC source for reducing transients.

7. The electronic timing circuit claimed in claim 5 wherein said threshold device is a neon tube.

8. The electronic timing device claimed in claim 5, further comprising a diode in parallel with said load terminals for absorbing transients from the load.

9. An electronic timing circuit comprising:

a pair of DC source terminals;

an RC circuit, including a series connected timing capacitor and timing resistor, coupled to one of said terminals;

an electronic latching device having cathode, anode and control electrodes, coupled via its anode and cathode electrodes between said RC circuit and the other terminal of said DC source;

means coupling the junction of the capacitor and resistor of the RC circuit to the control electrode of said latching device for initiating the firing thereof;

a pair of switchable contacts and a second resistor connected in series between said source terminals;

and a pair of load terminals disposed respectively at the junction of said switchable contacts and said second resistor, and the junction of the RC circuit resistor and said latching device.

10. The electronic timing device claimed in claim 9, in which said latching device is a silicon controlled rectifier, and in which said means for initiating the firing of said latching device is a neon tube.

11. The electronic timing circuit claimed in claim 10, further comprising a diode connected in parallel with said RC circuit resistor for reducing the reset time in said circuit.

References Cited

UNITED STATES PATENTS

| | | | |
|---|---|---|---|
| 3,195,033 | 7/1965 | Jones | 307—88.5 X |
| 3,223,852 | 12/1965 | Wright | 307—88.5 |
| 3,265,991 | 8/1966 | Ferguson | 307—88.5 X |
| 3,302,128 | 1/1967 | Schoemehl et al. | 331—111 X |
| 3,333,175 | 7/1967 | Klyce | 307—141 X |

ROBERT K. SCHAEFFER, *Primary Examiner.*

T. B. JOIKE, *Assistant Examiner.*

U.S. Cl. X.R.

307—252